//www.google.com/patents/US3363607

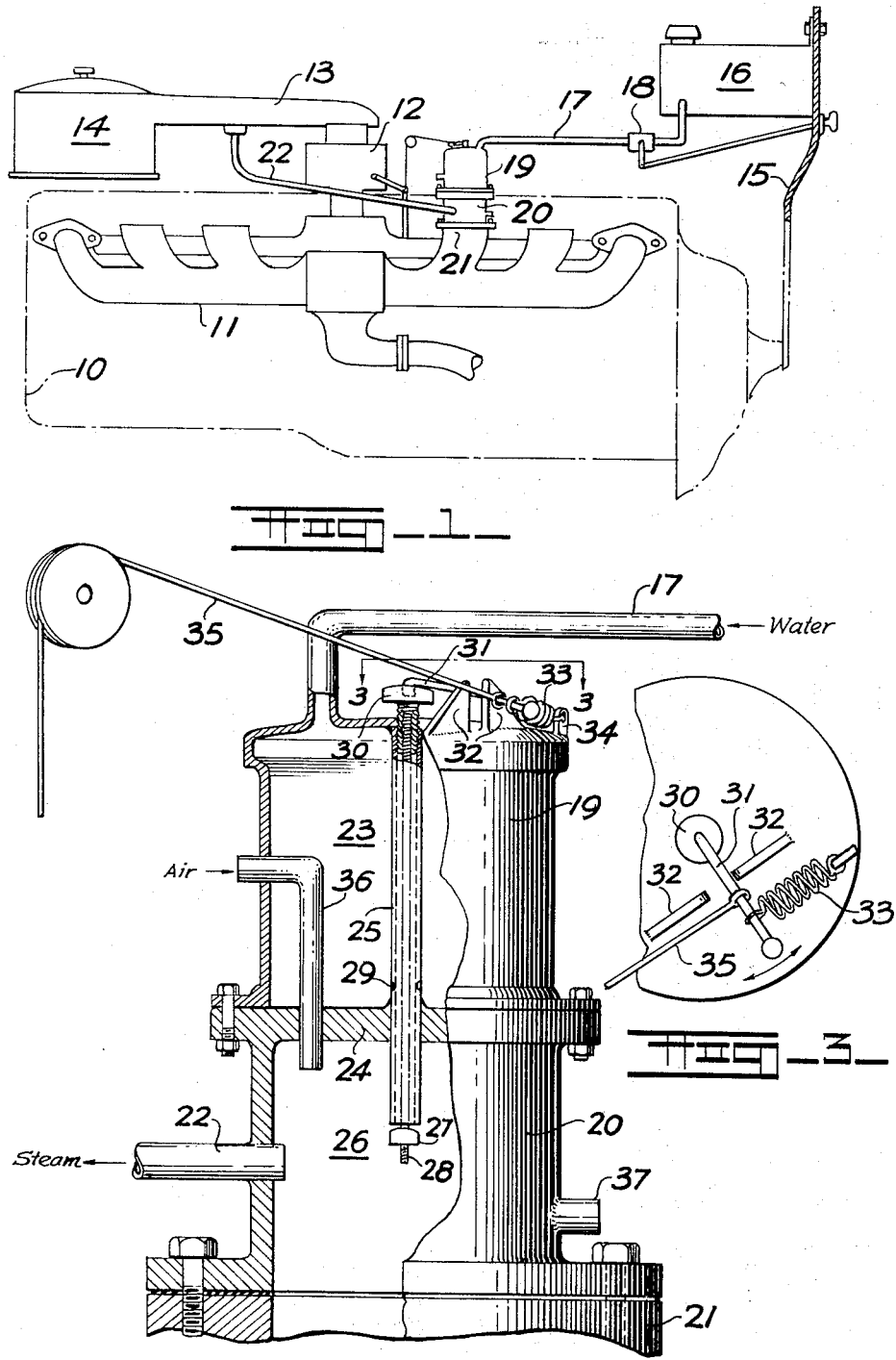

United States Patent Office 3,363,607
Patented Jan. 16, 1968

3,363,607
VAPOR GENERATING APPARATUS
Thomas E. Bayus, R.D. 1, Warner Road,
Brookfield, Ohio 44403
Filed Mar. 28, 1966, Ser. No. 538,069
3 Claims. (Cl. 123—25)

This invention relates to a vapor generating apparatus and more particularly for such apparatus as used in conjunction with internal combustion engines, such as found in motor vehicles.

The principal object of the invention is the provision of a vapor generating apparatus for use with an internal combustion engine wherein the heat of the engine vaporizes water supplied thereto and the apparatus directs the vapor into the air filter of the engine to supply water vapor thereto.

A further object of the invention is the provision of a novel and improved water vapor generating apparatus which is attachable directly to the exhaust manifold of an internal combustion engine and uses a portion thereof as a flash boiler surface for changing water to water vapor.

A still further object of the invention is the provision of a vapor generating apparatus for an internal combustion engine which has a variable rate of flow device controlling the water delivered thereto and capable of being actuated simultaneously with the accelerator of the internal combustion engine.

A still further object of the invention is the provision of a vapor generating apparatus for an internal combustion engine which is simple, inexpensive, easy to attach and which will perform efficiently in its intended purpose.

The vapor generating apparatus disclosed herein is intended for use with an internal combustion engine to supply water vapor to the air intake of the carburetor preferably by way of the air cleaner connected therewith so that the water vapor will be mixed with the air and vaporized fuel in the carburetor and drawn into the cylinders of the internal combustion engine where it will act to slow down the rate of combustion and thus increase the efficiency of the internal combustion engine. Those skilled in the art will observe that supplying water vapor to an internal combustion engine acts in the same manner as various additives commonly added to gasoline and at considerably less expense. The apparatus disclosed herein in an efficient and simple means of introducing water vapor.

With the foregoing and other objects in view which will apppear as the description proceeds, the invention resides in the combination arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a side view of a portion of an internal combustion engine incorporating my invention.

FIGURE 2 is an enlarged detailed elevation of the water vapor generating apparatus with parts in cross section and parts broken away.

FIGURE 3 is a top plan view on line 3—3 of FIGURE 2.

By referring to the drawings and FIGURE 1 in particular it will be seen that broken lines 10 outline a conventional internal combustion engine and that solid lines 11 illustrate the exhaust manifold of the internal combustion engine as will be understood by those skilled in the art. The engine is provided with a carburetor 12 having an air intake 13 and an air cleaner 14 also as conventional in the art and in FIGURE 1 of the drawings the fire wall or engine compartment wall 15 is illustrated and showing a water tank 16 attached thereto. A water supply line 17 controlled by a valve 18 establishes communication between the water tank 16 and the upper portion 19 of a two-part vaporizer, the lower portion of which is indicated by the numeral 20 and which is bolted directly to a flat portion 21 of the exhaust manifold 11. A pipe 22 extends between the lower portion 20 of the vaporizer and the air intake 13 of the carburetor so that water introduced into the vaporizer through the pipe 17 and vaporized by the heat of the exhaust manifold 11 as hereinafter described will be conveyed by the pipe 22 into the air intake 13 of the carburetor.

By referring now to FIGURE 2 of the drawings, it will be seen that the water supply line 17 communicates directly with the upper portion 19 of the two-part vaporizer and specifically with a chamber 23 therein which chamber is defined by the cylindrical walls of the upper portion 19 of the vaporizer and the upper horizontal wall 24 of the lower portion 20 of the vaporizer. An apertured tube 25 extends vertically through the chamber 23 and through the upper horizontal wall 24 of the portion 20 and terminates therebelow and within a chamber 26 defined by the cylindrical wall of the lower portion 20 of the vaporizer. A movable valve element 27 is positioned on the lower end of a valve stem 28 which in turn extends vertically through the apertured tube 25. The apertures in the tube 25 are indicated by the numeral 29 and are located near the lower portion of the chamber 23 so that water in the chamber 23 will enter the apertures 29 and run downwardly through the tube 25 and be under control of the valve element 27. The upper end of the valve element 27 extends upwardly out of the top of the upper portion 19 of the vaporizer and has a head portion 30 which has an integral sidewardly extending arm 31 thereon and by means of which arm 31 the stem 28 may be rotated to cause it to move vertically as it responds to a thread pattern formed adjacent its upper end and engaged in a matched thread pattern in the upper end of the tube 25. The arm 31 extends between a pair of spaced brackets 32 and a spring 33 is attached to the arm and to a secondary bracket 34 on the device and normally biases the valve mechanism just described to near shut-off position. A flexible cable 35 is also attached to the arm 31 and arranged to be moved by a portion of the carburetor as seen in FIGURE 1 of the drawing so that increasing the amount of air admitted to the carburetor will result in moving the arm 31 and the valve arrangement so as to increase the amount of water that will be released from the apertured tube 25 into the chamber 26.

FIGURE 3 of the drawing shows a top plan view of the arm 31 and spring 33 and the end of a cable 35. It will thus be seen that water is admitted in greater or lesser degree through the valve construction just described to the chamber 26 and it drops directly onto the heated flat surface 21 of the intake manifold 11 where it is immediately vaporized in a flash boiler operation. The pipe 22 communicates with the chamber 26 and the air intake 13 of the carburetor as heretofore described so that the water vapor will be drawn therethrough into the air intake 13 and the carburetor 12. In order that there will be a continuous circulation through the chamber 26, there is a bypass air line 36 which extends through the outer wall of the upper portion 19 of the vaporizer and downwardly through the upper horizontal wall 24 of the lower portion of the vaporizer and serves to admit air into the uppermost portion of the chamber 26 where it will mix with the water vapor and in turn be drawn into the pipe 22 as aforesaid. In the event water accumulates in the lower portion 20 of the vaporizer, it will automatically drain away through a drain fitting 37 leaving only a relatively small amount which will be readily vaporized when the internal combustion engine on which the device is installed is next operated.

It will thus be seen that a novel improved water vapor generator has been disclosed which incorporates a portion in which water is vaporized by bringing it into direct contact with a hot surface of an intake manifold and that it is supplied from a relatively small built-in reservoir comprising the chamber 23 in the device so that the water is initially heated and therefore always available for use in the vaporizer. It will occur to those skilled in the art that the vaporizer may be attached to the exhaust manifold of an internal combustion engine by suitable clamp means (not shown) rather than by the bolts as illustrated in FIGURE 2 of the drawings and that in either event, it will operate efficiently for its intended purpose.

It will thus be seen that a water vapor generator for an internal combustion engine has ben disclosed which meets the several objects of the invention, and having thus described my invention, what I claim is:

1. A water vapor generator for an internal combustion engine having a carburetor and an exhaust manifold including a flattened upper horizontal surface, said vaporizer comprising a body member directly attachable to said surface and having an upper and a lower chamber therein, a dividing wall separating said upper and lower chambers, a tubular member extending vertically through said upper chamber and through said horizontal wall and into said lower chamber, apertures in said tubular member communicating with said upper chamber, a source of water supply in communication with said upper chamber and valve means on said tubular member and means in communication with said lower chamber for directing water vapor formed therein to the air intake of said carburetor.

2. The water vapor generator set forth in claim 1 and wherein the valve means includes a valve stem positioned in said tubular member and extending outwardly thereof, a valve element on said valve stem and means for imparting motion to said valve stem.

3. The water vapor generator set forth in claim 2 and wherein said means for imparting motion to said valve stem comprises a lever and a spring normally biasing said lever in one direction.

References Cited

UNITED STATES PATENTS

| | | | |
|---|---|---|---|
| 837,877 | 12/1906 | Orcutt et al. | 126—271.1 |
| 1,301,999 | 4/1919 | Billings | 123—25 |
| 1,334,952 | 3/1920 | Harriman | 123—25 X |
| 2,489,745 | 11/1949 | Blumberg et al. | 123—25 |
| 2,748,755 | 6/1956 | McCutcheon | 123—25 |
| 3,115,872 | 12/1963 | Berger | 123—25 |

AL LAWRENCE SMITH, *Primary Examiner.*